March 31, 1925.

H. H. COLLINS

LICENSE PLATE AND HOLDER

Filed March 11, 1924

1,532,091

Harold H. Collins,

By Lacy & Lacy, Attorneys

Patented Mar. 31, 1925.

1,532,091

UNITED STATES PATENT OFFICE.

HAROLD H. COLLINS, OF CLIFTON, OHIO.

LICENSE PLATE AND HOLDER.

Application filed March 11, 1924. Serial No. 698,504.

*To all whom it may concern:*

Be it known that I, HAROLD H. COLLINS, a citizen of the United States, residing at Clifton, in the county of Hamilton and State of Ohio, have invented certain new and useful Improvements in License Plates and Holders, of which the following is a specification.

This invention relates to an improved license plate and holder for motor vehicles and seeks, among other objects, to provide a device which will render the license plate equally visible both at night and in the daytime.

The invention seeks, as a further object, to provide a device wherein the license plate will be protected from dust and dirt as well as from the weather.

And the invention seeks, as a still further object, to provide a device wherein the license plate may be easily assembled upon the holder or removed therefrom and wherein, under ordinary circumstances, the plate will be rigidly and securely held in position.

Other and incidental objects will appear hereinafter.

Figure 1:
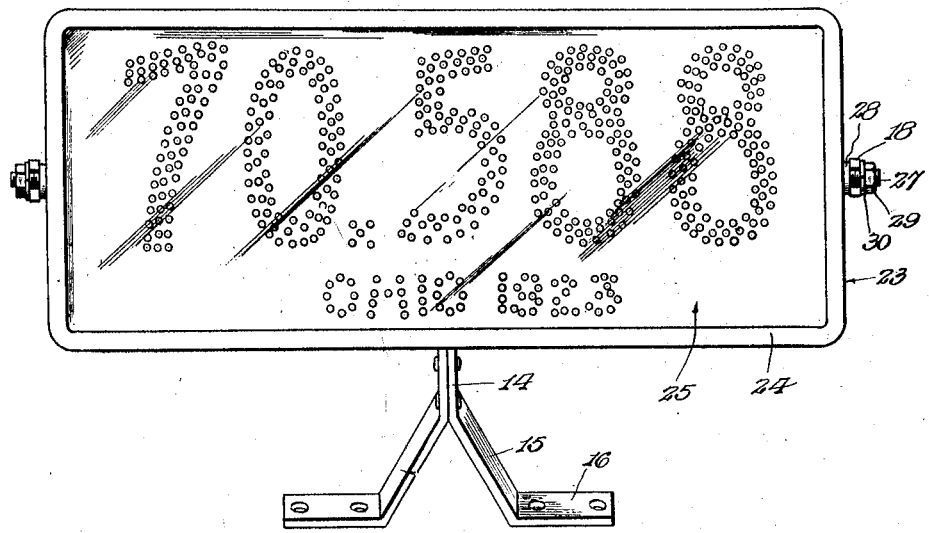
Figure 1 is a front elevation of my improved license plate holder.
Figure 2:
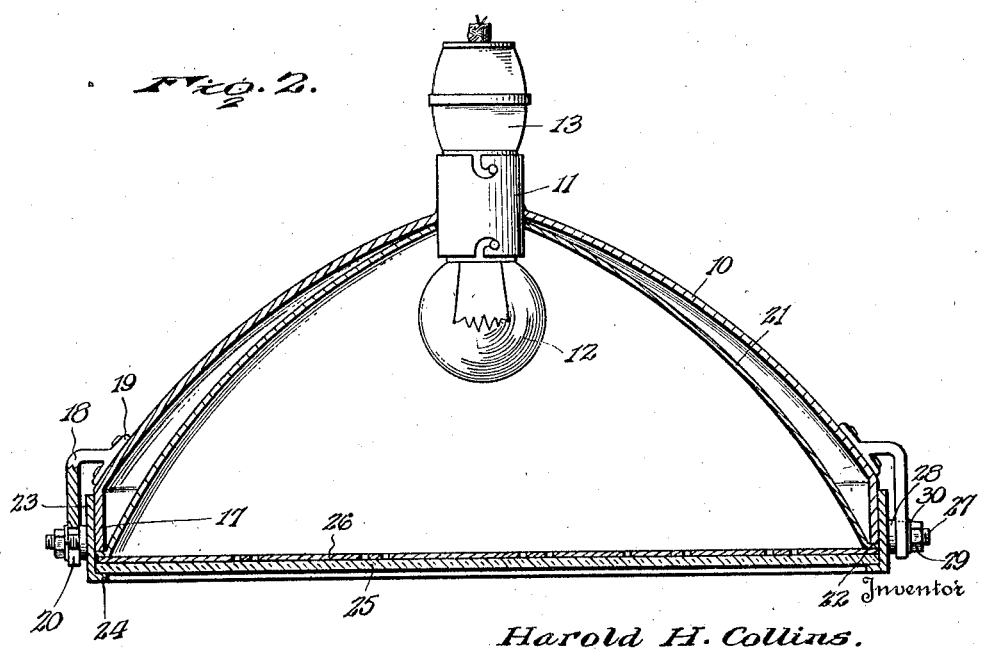
Figure 2 is a horizontal sectional view taken medially through the device.

In carrying the invention into effect, I employ a preferably sheet metal casing 10 oblong at the front thereof and provided with concavo convex side and end walls converging toward the rear of the casing. Extending through the casing at the back thereof is a permanently mounted double-ended lamp socket 11 of appropriate design and removably fitting in the socket at its inner end is a lamp 12 while the outer end of the socket removably accommodates the customary plug 13 connecting the necessary circuit wires with the socket for supplying current to the lamp. Riveted or otherwise secured to the casing at the lower side thereof is a bracket 14 having diverging legs 15 bent at their lower ends to form lugs 16 and, as will be observed, these lugs are apertured to accommodate bolts or other suitable fastening devices for securing the bracket to a vehicle so that the device may thus be rigidly attached.

At their forward margins, the walls of the casing are straight and flat to define a rectangular rim 17, and mounted upon the end walls of the casing immediately in the rear of said rim are angle shaped brackets 18. These brackets are provided with base portions 19 riveted or otherwise secured to said walls so that the brackets thus project forwardly at the ends of the rim, and formed in the ends of the brackets are slots 20. Freely accommodated in the casing 10 is a reflector 21 substantially conforming in general outline to the outline of the casing and provided with an opening to accommodate the socket 11 therethrough while at its forward edge said reflector is formed with a flange 22 fitting the rim 17 to overhang the outer edge thereof. Removably fitting over the rim is a rectangular frame 23 on which is formed a flange 24 and seating against said flange at its inner side is a closure pane 25. Overlying the closure pane is a license plate 26 through which is stenciled, as suggested in Figure 1, an appropriate license number, together with the name of the State issuing the license and the year for which the license is current. As illustrated, the several digits as well as the letters of the name of the State are each formed by closely perforating an area with minute openings conforming to the outline of the digit or letter. Extending laterally from the ends of the frame 23 are studs 27 which are freely received in the slots 20 of the brackets 18 and are formed with base portions 28 snugly accommodated beneath the brackets. Screwed upon the studs are nuts 29 and preferably arranged between said nuts and the brackets are split resilient locking washers 30. Thus, after the closure pane and license plate have been arranged within the frame, the frame may be applied over the rim 17 of the casing and advanced thereon for clamping the license plate against the flange 22 of the reflector 21 and also clamping the closure pane against the license plate. Accordingly, by then applying the nuts 29 the frame may be tightly secured in position rigidly holding the several parts in assembled relation. At the same time, by removing the frame, the license plate may be readily displaced when, if found necessary, by removing the lamp 12, the reflector may be displaced. The entire device may thus be easily cleaned. In use, the lamp 12 will be preferably colored red so that when the filament of the lamp is energized the numbering and lettering of the license plate will be illuminated with a red light and will, accordingly, be readily visible.

Having thus described the invention, what I claim is:

1. A device of the character described including a casing, a frame fitting over the casing at the front thereof, a closure pane carried by said frame, studs fixed on the frame, brackets on the casing and provided with slots opening through the free ends of the brackets to removably accommodate said studs, and means carried by the studs to engage the brackets securing the frame in position.

2. A device of the character described including a casing open at the front thereof and provided with a rim, a frame fitting over the rim of the casing, a transparency carried by said frame, angle shaped brackets secured to the casing to project forwardly at the front of the casing and provided with slots opening through the forward ends of the brackets, studs fixed on the frame freely received in said slots and provided with base portions snugly accommodated beneath the brackets to form abutments therefor, and nuts on said studs clamping the brackets between the nuts and the base portions of said studs for securing the frame in position.

In testimony whereof I affix my signature.

HAROLD H. COLLINS. [L. S.]